United States Patent [19]

Rewitzer

[11] Patent Number: 5,078,221

[45] Date of Patent: Jan. 7, 1992

[54] STEERING ROLLER ARRANGEMENT FOR A THREE-WHEELED VEHICLE

[75] Inventor: Siegfried Rewitzer, Ihrlerstein, Fed. Rep. of Germany

[73] Assignee: Hoechst Aktiengesellschaft, Fed. Rep. of Germany

[21] Appl. No.: 437,844

[22] Filed: Nov. 16, 1989

[30] Foreign Application Priority Data

Nov. 18, 1988 [DE] Fed. Rep. of Germany ....... 3839107

[51] Int. Cl.$^5$ ................. B60B 33/00; B62D 11/02; B62D 61/08
[52] U.S. Cl. .................. 180/6.2; 180/215; 16/31 R; 16/46; 16/47
[58] Field of Search .......... 16/46, 47, 48, 31 R, 16/35 R; 180/6.2, 6.5, 210, 215; 280/109

[56] References Cited

U.S. PATENT DOCUMENTS

| 1,194,780 | 8/1916 | Pavey | 16/47 |
| 1,622,447 | 3/1927 | Kalberer | 16/47 |
| 1,633,638 | 6/1927 | Jarvis et al. | 16/35 R |
| 2,172,387 | 9/1937 | Kantrowitz | 16/46 |
| 2,786,305 | 3/1957 | Carter | 16/47 |
| 3,015,838 | 1/1962 | Ulinski | 16/31 R |
| 3,893,530 | 7/1975 | Gordon | 180/6.5 |

FOREIGN PATENT DOCUMENTS

| 1339832 | 9/1963 | France . |
| 84084 | 10/1964 | France . |
| 58-16902 | 1/1983 | Japan | 16/46 |
| 427728 | 4/1935 | United Kingdom | 16/46 |
| 603936 | 6/1948 | United Kingdom . |
| 693320 | 6/1953 | United Kingdom . |
| 2170400 | 8/1986 | United Kingdom . |

Primary Examiner—Charles A. Marmor
Assistant Examiner—Karin Tyson
Attorney, Agent, or Firm—Connolly and Hutz

[57] ABSTRACT

A steering roller arrangement for a trackless floor vehicle in the form of a so-called three-wheeled vehicle is described. With this vehicle, in addition to two running wheels, a steering roller is provided which can be swiveled about a vertical axis by means of a ring mount for traveling in a curved line and to achieve a trailing effect. Relative to the rotatable part of the ring mount, the steering roller is movable between two opposite trailing positions such that, with a reversal of the direction of travel, the required alteration of the steering roller trailing effect is brought about by a corresponding adjustment of the steering roller. In this way uncontrolled veering of the vehicle is avoided which occur with conventional three-wheeled vehicles on account of the rotation of the steering roller by 180° caused by the trailing effect of the steering roller. The steering roller is expediently displaceable in a straight line by a linear guide between the two trailing positions. The linear guide can serve at the same time as a self-aligning bearing, by mans of which the steering roller can be tilted about a horizontal axis to adapt to unevenness in the floor.

9 Claims, 5 Drawing Sheets

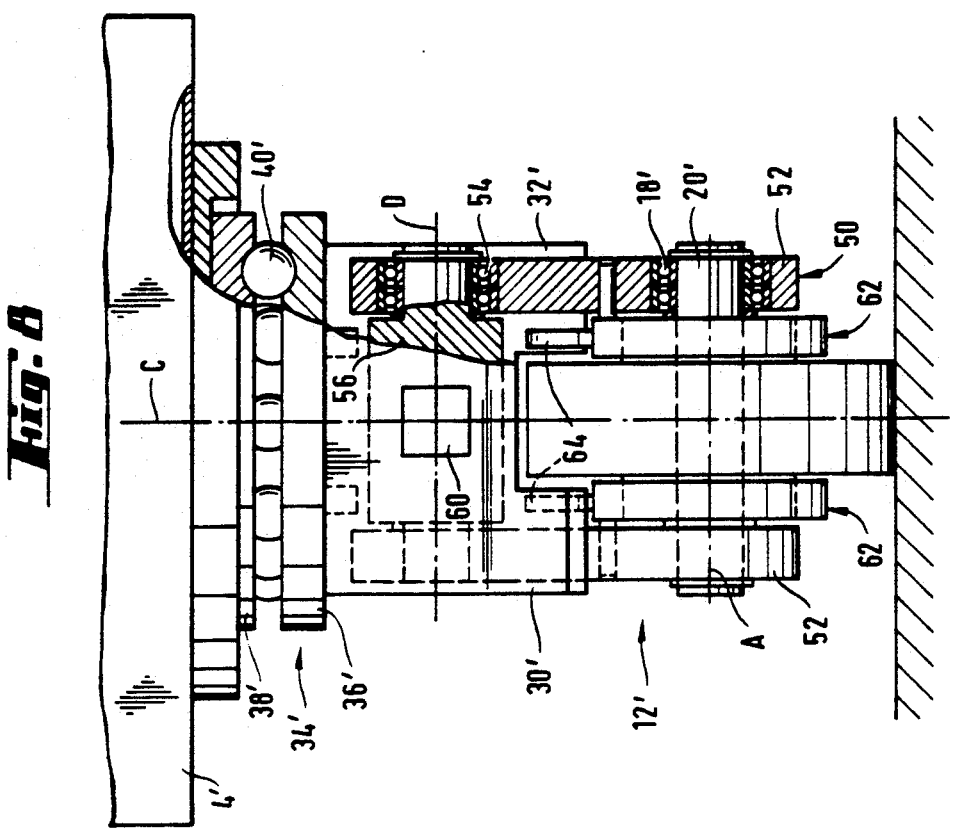
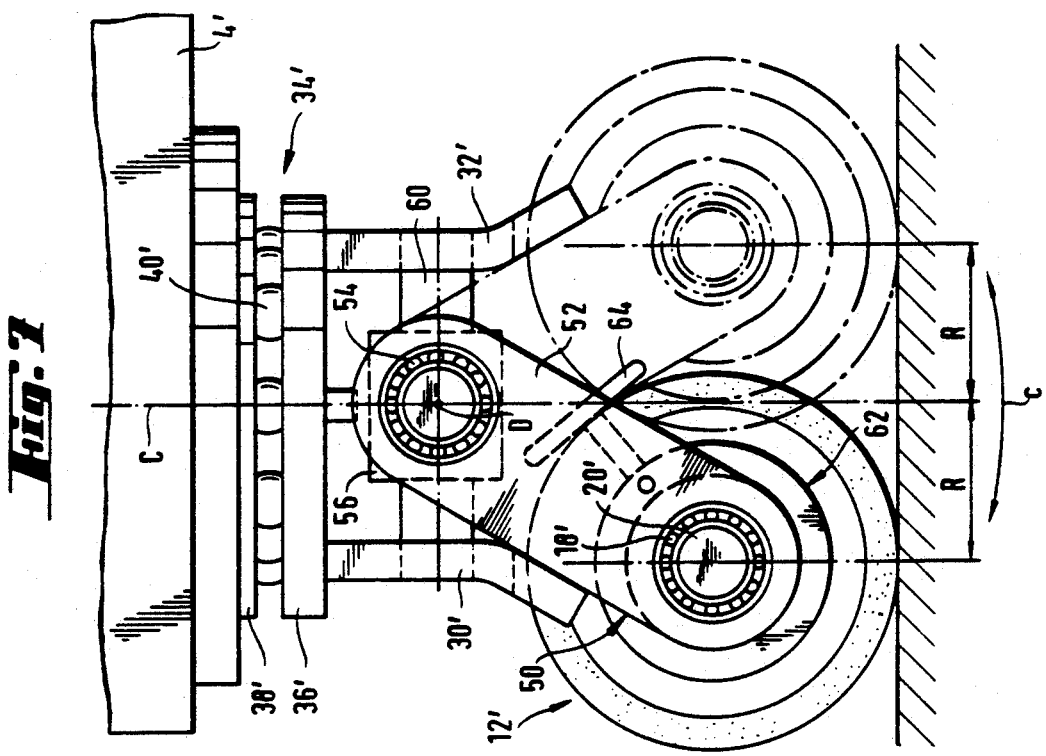

STEERING ROLLER ARRANGEMENT FOR A THREE-WHEELED VEHICLE

The invention relates to a steering roller arrangement for a trackless floor vehicle.

Three-wheeled vehicles of this kind, which are used in particular as transport systems for works transport tasks, have been known for a long time. With these vehicles, the various possibilities of movement and, in particular, the steering are frequently achieved by a different drive of the two drivable running wheels (armored vehicle control). For the purpose of traveling in a straight line, in forward and reverse direction, both running wheels are driven at identical speed. For traveling in a curved line, in forward and reverse direction, the two running wheels are driven at unidentical speed. If the two running wheels are driven at identical speed and in opposite turning directions, the vehicle rotates on the spot.

In this case, the steering roller, which is not driven and not directly controlled or steered either, allows traveling in a curved line or turning on the spot. However, on account of the trailing effect of the steering roller, steering problems occur with a reversal of the direction of travel. Since, with a change in the direction of travel, the steering roller is swiveled 180° to alter the trailing effect, the vehicle veers uncontrolledly, i.e. the vehicle is inevitably deflected from the path (travel route deviation) the trailing radius of the steering roller. The steering control system detects this deviation and counteracts this deviation movement of the vehicle. By this means, high forces and torques arise in the steering and drive system which result in correspondingly large flexing and shearingly large amount of wear on the wheels. Additionally, in this case a high drive power is required briefly since the steering control counteracts the travel route deviation.

The object of the invention is to develop a steering roller arrangement of the generic type specified at the beginning in such a way that the stresses occurring in the prior art on the drive system and the wheels with a change in the direction of travel are avoided.

With the steering roller arrangement designed according to the invention, with a reversal of the direction of travel, the required alteration of the trailing effect is brought about by an adjustment of the steering roller relative to the rotatable part of the ring mount. Consequently, since the ring mount does not have to carry out a turning movement for a reversal of the trailing effect, there is also no longer a deflection movement of the steering roller such that the uncontrolled veerings (travel route deviations) of the vehicle are avoided.

The steering roller is preferably mounted displaceably in a straight line on the ring mount for the adjustment between the two trailing positions by means of a linear guide. On start-up, in order that the vehicle is firstly displaced on the linear guide before the steering roller begins to roll, the friction resistance of the linear guide and of the wheel bearing of the steering roller is smaller than the friction resistance between the steering roller and the floor. Consequently, an additional relief of the drive system results from the fact that the two running wheels and the steering roller do not overcome the breakaway force simultaneously, but successively.

The reduction in power peaks resulting therefrom in comparison with conventional vehicles leads to a relatively low energy consumption and thus to less wear on the drive.

In a further embodiment of the invention, it is provided that the steering roller is rotatable about an axle perpendicular to the wheel axle and to the ring mount axis by means of a self-aligning bearing to adapt to unevenness in the floor. This arrangement is particularly advantageous if the steering roller comprises a pair of wheels, both wheels of which are rotatably mounted on a common axle shaft. In this case it is avoided by means of the self-aligning bearing that one of the wheels rises from the floor; even with unevenness in the floor, floor contact of all wheels is therefore ensured.

According to a particularly advantageous embodiment of the invention, it is provided that the linear guide is designed simultaneously as a self-aligning bearing. This solution is characterized by simplicity of construction, low space requirement and high reliability of function.

The adjustment of the steering roller between the two trailing positions can be brought about by a swivel movement about an axis perpendicular to the ring mount axis and parallel to the wheel axle instead of by a linear displacement.

The steering roller arrangement designed according to the invention is particularly suitable for a floor vehicle, in which the two running wheels are drivable - independently of each other for steering the vehicle. Instead, the drive force can, however, also be effected from outside (by pulling or pushing). The invention is applicable with vehicles with or without a driver, with vehicles for transporting loads, with vehicles having current connectors or with other floor vehicles with which a steering roller arrangement is provided.

Two exemplary embodiments of the invention are described in greater detail with reference to the drawings, in which:

FIGS. 7, 8 show views corresponding to FIGS. 3 and 4 of a second exemplary embodiment.

Figure 1:
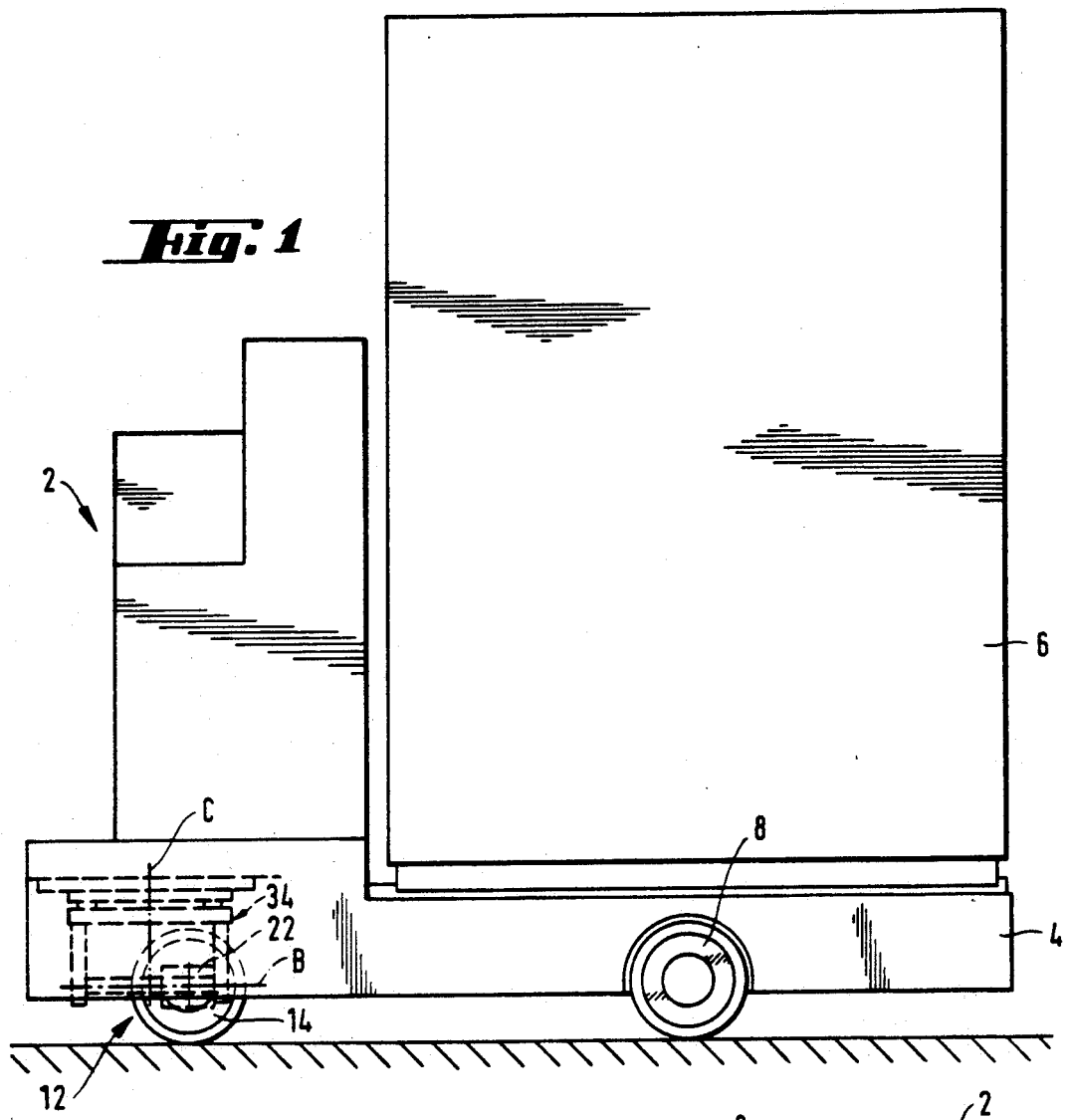
FIG. 1 shows a lateral view of a floor vehicle with a schematically indicated steering roller arrangement.
Figure 2:
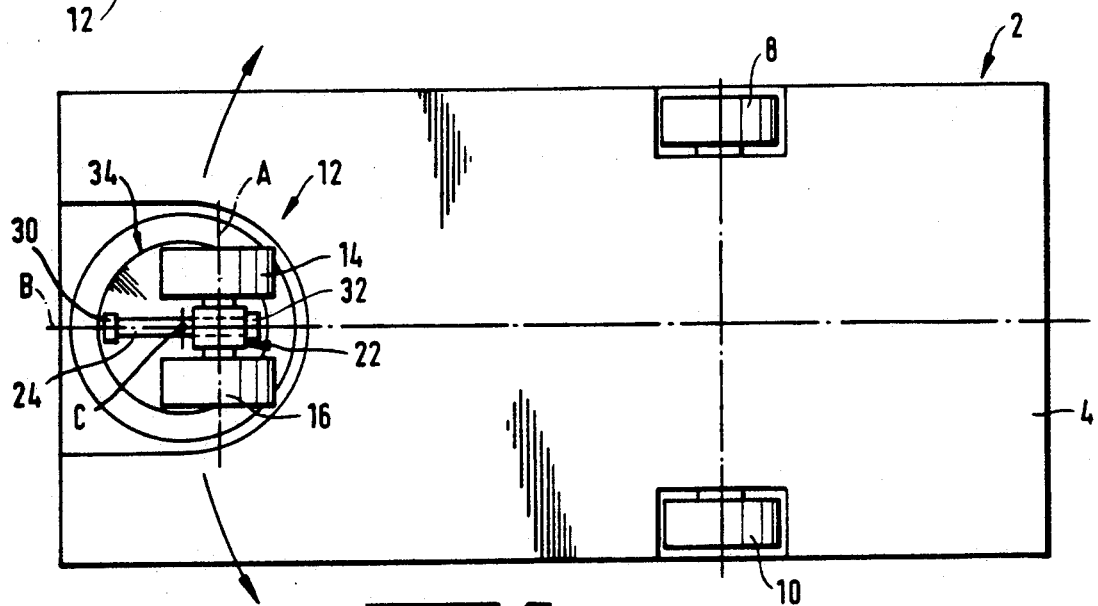
FIG. 2 shows a plan view from below of the vehicle in FIG. 1.

The driverless floor vehicle 2, represented in FIGS. 1 and 2, having a vehicle frame 4, serves to transport loads such as the represented load 6. It has two running wheels 8, 10, which are rotatable about wheel axles lying on a common line and indicated in FIG. 2 by a dot/dashed line and which can be driven by two drive motors (not shown) independently of each other and in both turning directions.

A non-driven steering roller 12 is composed of two wheels 14, 16, the wheel axle A of which has a horizontal distance from the wheel axles of the running wheels 8, 10 and which are arranged in relation to the running wheels 8, 10 in such a way that a "three-wheeled" vehicle results.

Figure 3:
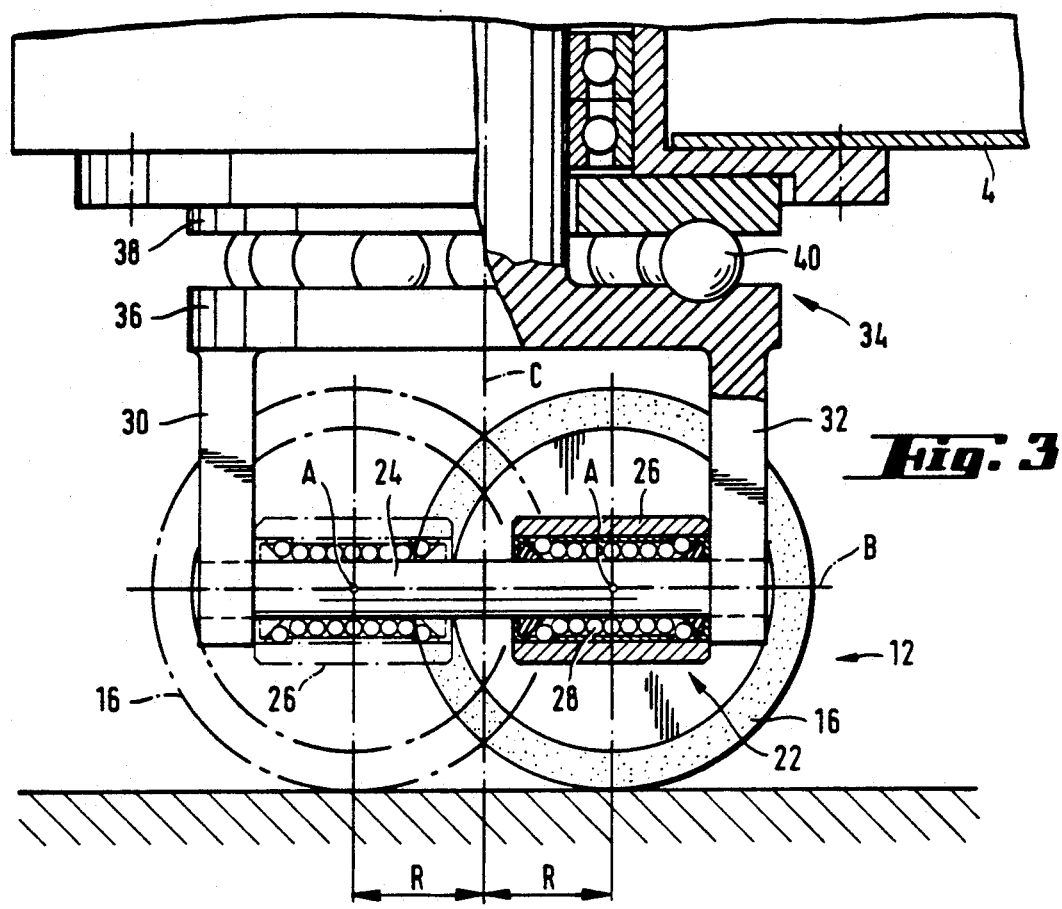
FIG. 3 shows an enlarged, partially sectioned lateral view of the steering roller arrangement of the vehicle according to FIGS. 1 and 2.
Figure 4:
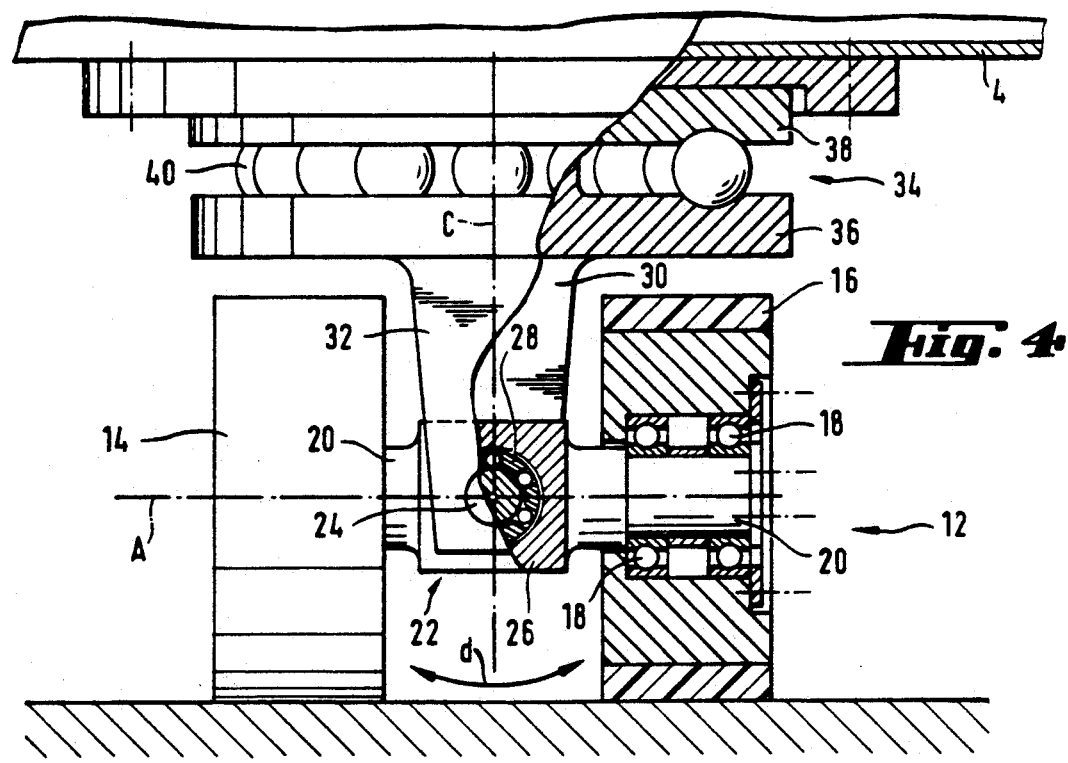
FIG. 4 shows a view of the steering roller arrangement corresponding to FIG. 3, but turned by 90°.

The wheels 14, 16 can be of any design and are mounted rotatably by means of a rolling bearing 18 on a common axle shaft 20 (cf. FIGS. 3, 4). The axle shaft 20 and thus the steering roller 12 are displaceable in a straight line relative to the vehicle frame 4 by means of a linear guide 22; at the same time the linear guide 22 is constructed as a self-aligning bearing, such that the axle shaft 20 and thus both the wheels 14, 1 of the steering roller 12 are rotatable about an axle B which coincides with the direction of displacement of the linear guide 22 and is positioned perpendicular on the wheel axle A.

The linear guide 22 has a guide rod 24 on which a guide bush 26 is mounted rotatably and axially displaceably by means of a rolling bearing 28 constructed as a ball bearing. The guide bush 26 is constructed in one piece with the axle shaft 20, i.e. it forms the central part of the axle shaft 20 such that the linear guide 22, as already mentioned, allows both an axial displacement and a turning movement of the axle shaft 20 as well as of both wheels 14, 16 of the steering roller 12.

At the two ends of the guide rod 24, two vertical arms 30, 32 are fixed which connect the guide rod 24 to the vehicle frame 4 via a ring mount 34. The arms 30, 32 serve at the same time as stops for the linear displacement of the guide bush 26, as will be explained in more detail.

Instead of the arrangement represented, the axle shaft 20 (via the guide bush 26) could be connected fixedly to the guide rod 24 -In this case the guide rod 24, then correspondingly extended, would be mounted rotatably as well as axially displaceably in the arms 30, 32.

The ring mount 34 has two ring plates 36, 38 which are rotatable relative to each other via balls 40 and the whereas the other ring plate 36 is connected fixedly to the arms 30, 32.

The ring mount 34 allows the steering roller 12 to turn about a vertical axis C such that the not directly steered or controlled steering roller 12 can assume a corresponding tilted position in relation to the running wheels 8, 10 when the vehicle is traveling in a curved line. Furthermore, the ring mount 34 allows a trailing effect of the steering roller 12 since the vertical axis C has a horizontal distance corresponding to the trailing radius R from the wheel axle A of the steering roller 12 when the steering roller 12 assumes one of its two stop positions (cf. FIG. 3).

In operation, the vehicle 2 is steered by control of the two running wheels 14, 16. When traveling in a curved line the two running wheels 14, 16 are driven at different speeds; in this case the steering roller 12, which has a trailing effect corresponding to the trailing radius R, follows—on account of its swivel mounting about the ring mount axis C—the resulting path of curves. If the two running wheels 14, 16 are driven at identical speed, but in opposite turning directions, the vehicle 2 rotates on the spot.

Figure 5:
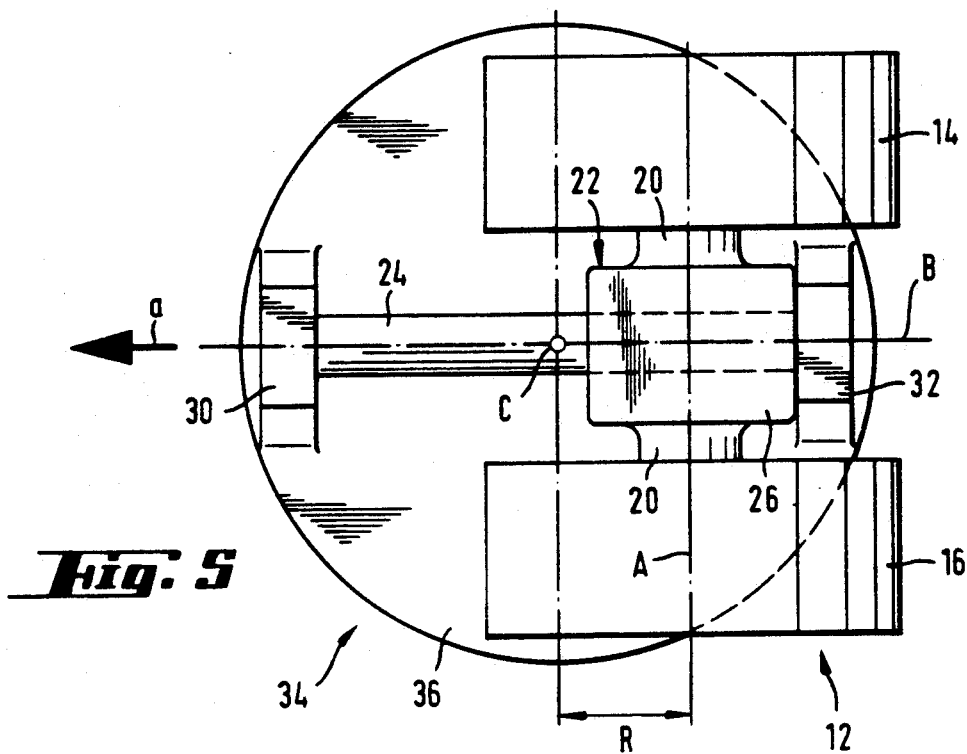
FIGS. 5, 6 show a view of the steering roller arrangement from below, the steering roller being in its trailing position for forward travel in the one Figure and in its trailing position for reverse travel in the other Figure.

To explain a reversal in the direction of travel, it is assumed that the vehicle has firstly moved in forward direction. The forward direction is indicated in FIG. 5 by an arrow a. With forward travel, the guide bush 26 has borne against the arm 32 serving as a stop. The two wheels 14, 16 of the steering roller 12 thus assume one of their two trailing positions, in which their wheel axle is removed from the vertical ring mount axis C by the trailing radius R (cf. also FIG. 3).

Figure 6:
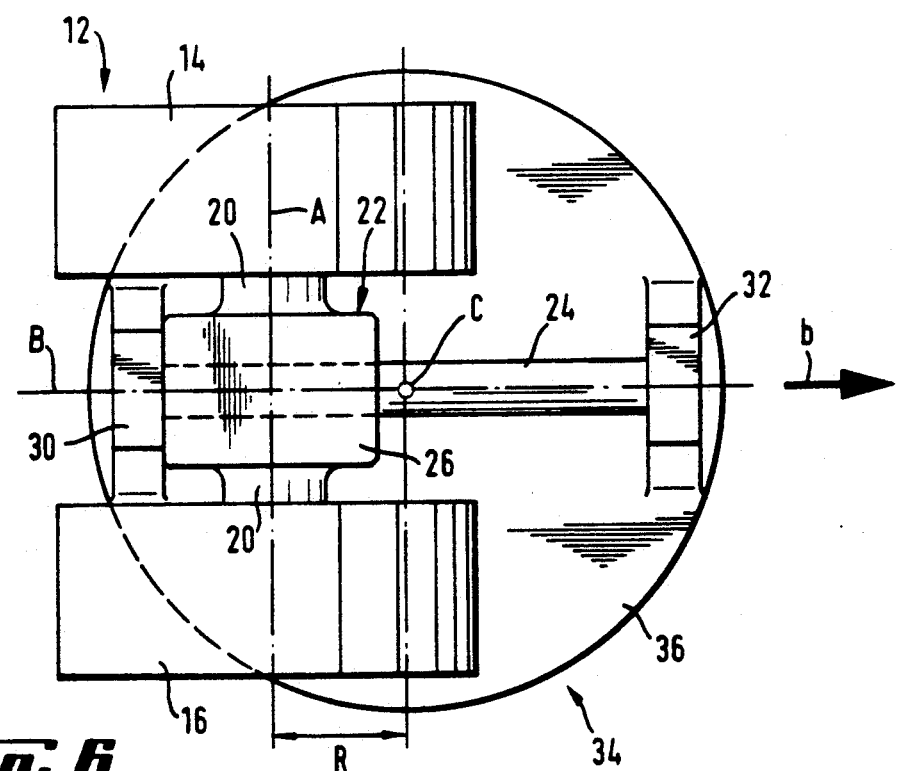

If the running wheels 8, 10 are now turned in the opposite direction, the vehicle 2 moves to the right in FIG. 5 or in the direction of the arrow b in FIG. 6. In this case the two wheels 14, 16 of the steering roller 12 firstly remain stationary. This is due to the fact that the friction resistance of the linear guide 22 and the wheel bearing 18 is smaller than the friction resistance between the wheels 14, 16 and the floor. This relation between the friction resistances can be determined both by calculation and by experiment.

Consequently, while the vehicle moves in reverse direction (in the direction of the arrow b) and the wheels 14, 16 of the steering roller 12 remain stationary, the guide bush 26 slides on the guide rod 24 until the guide bush 26 bears against the arm 30 (on the left side in FIGS. 5, 6). The wheels 14, 16 have now assumed their new trailing position, in which their wheel axle A is spaced by the trailing radius R at a distance from the ring mount axis C. The wheels 14, 16 of the steering roller 12 now likewise begin to roll, that is at a time at which the two running wheels 8, 10 are already in motion.

Since the linear guide 22 is constructed at the same time as a self-aligning bearing, the two wheels 14, 16 of the steering roller 12 can adapt to unevenness in the floor during the movement of the vehicle. In this way a permanent floor contact of all wheels is ensured.

An arresting device (not shown), which can be constructed mechanically, electro-mechanically, hydraulically, or in a similar manner, could be provided for the guide bush 26 of the linear guide 22 at the two end positions (trailing positions).

The steering roller 12 could also be built with only one wheel instead of with two wheels. However, this could lead to the vehicle being unstable if the wheel of the steering roller cannot be wide enough.

With the second exemplary embodiment shown in FIGS. 7 and 8, the same reference numerals, but provided with an apostrophe, have been used for components which correspond to the preceding exemplary embodiment.

The main difference of the exemplary embodiment of FIGS. 7 and 8 compared with the preceding exemplary embodiment consists in the fact that the steering roller 12' is not adjustable by a displacement in a straight line, but by a swivel movement about an axis D, parallel to the wheel axle A, between its two trailing positions. For this purpose a lever arrangement 50 with two levers 52 is provided, in the one end of which the steering roller 12' comprising only one wheel is mounted rotatably via the wheel bearing 18' while the other ends of the levers 52 are suspended rotatably about the axis D on a bearing element 56 via rolling bearing 54.

The bearing element 56 is fixed to the cross-rod 60 which, in turn, is fastened to the two arms 30', 32', which protrude downwards from the rotatable part 36' of the ring mount 34 The two arms 30', 32' with their free ends extending obliquely serve at the same time as stops for the levers 52 and, consequently, as a limit for the adjusting movement of the steering roller 12' between the two trailing positions.

On its two axial sides, the steering roller 12' is assigned a one-way brake 62 which is reversible in terms of the turning direction by means of control lever 64. In this way the one-way brake 62 can be controlled in such a way that it blocks the steering roller 12' counter to the trailing direction in each case.

The repositioning of the steering roller 12' between its two trailing positions is brought about by a turning movement of the lever arrangement 50 about the axis D (cf. the double arrow c in FIG. 7). As already mentioned, in this case the free ends, extending obliquely, of the arms 30', 32' serve as limiting stops. For the reversal of the trailing position, the one-way brake 62 is to be switched over by the control lever 64 from its one effective turning direction to its other effective turning direction. The exemplary embodiment shown in FIGS. 7 and 8 has the advantage that the steering roller is stable in its two trailing positions. However, the exemplary embodiment of FIGS. 7 and 8 requires a somewhat larger constructional outlay; additionally, the vehicle must be raised slightly during the switchover from the one to the other trailing position.

Figure 9:
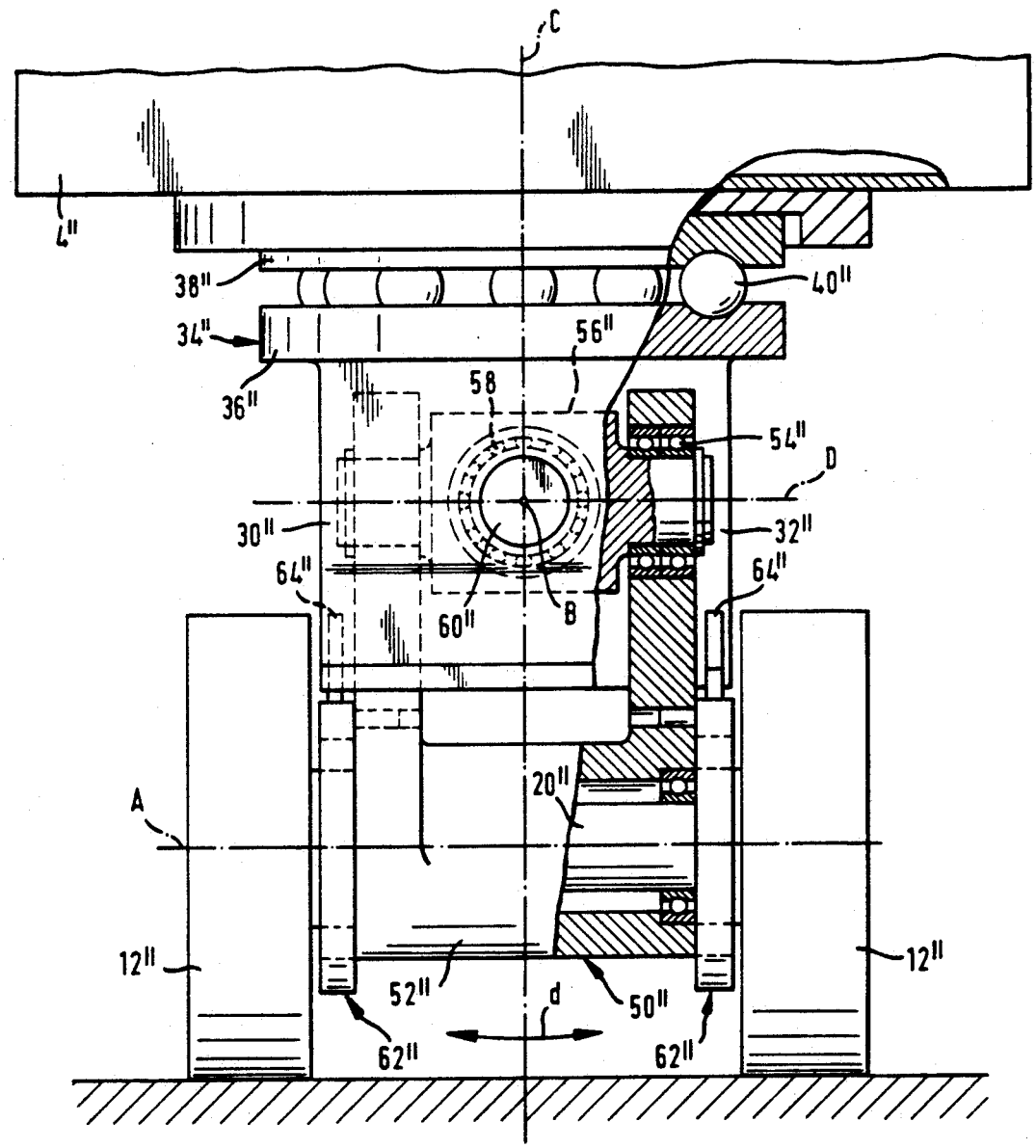
FIG. 9 shows a view corresponding to FIG. 4 of a further exemplary embodiment.

With the variant, shown in FIG. 9, of the embodiment of FIGS. 7 and 8, the same reference numerals, but provided with two apostrophes, have been used for components which correspond to the preceding exemplary embodiments.

The main difference of the exemplary embodiment of FIG. 9 compared with the preceding exemplary embodiment consists in the fact that, here, only one lever 52" is present, on the axle 20" of which two wheels 12" are fixed symmetrically to the right and left of the lever, and that the bearing element 56 is mounted rotatably about the axle B on the transverse rod 60" by means of self-aligning bearing 58, which is likewise constructed as a rolling bearing.

The remaining constructional elements and functions correspond to those of the constructional form of FIGS. 7 and 8.

On account of the self-aligning bearing 58, the pair of steering rollers 12" is rotatable about the axle B (cf. the double arrow d in FIG. 9) such that it can adapt to unevenness in the floor.

I claim:

1. A steering roller arrangement for a trackless floor vehicle having a frame and two running wheels fixedly arranged on the frame and rotatably, independently of each other, about axles lying on a common line, and a steering roller running on the floor freely rotatable about a wheel axle at a distance from the axles of the running wheels, a rotatably ring mount, the axis of which extends vertically, connecting the steering roller to the vehicle frame and constructed to provide a trailing effect to the steering roller, a horizontal distance between the vertical axis of the ring mount and the wheel axle of the steering roller comprising a trailing radius, and wherein the steering roller is movable relative to the rotatable ring mount over a path corresponding to twice the trailing radius between two opposite trailing positions whereby upon a reversal of the direction of travel alteration of the steering roller trailing effect is brought about any a corresponding movement of the steering roller relative to the rotatable ring mount, and a linear guide including a horizontal guide rod connected to rotate with the ring mount, the steering roller being slidably connected to the guide rod for unrestricted movement from one end of the guide rod to the other for adjustment between the two trailing positions and the wheel axle extending perpendicular to the guide rod.

2. A steering roller arrangement as in claim 1 including a self-aligning bearing rotatably mounting the steering roller about an axle perpendicular to the wheel axle and perpendicular to the vertical axis of the ring mount for adapting the steering roller to any unevenness in the floor.

3. A steering roller arrangement as in claim 2 wherein the steering roller includes a wheel bearing and wherein the frictional resistance of the linear guide and of the wheel bearing of the steering roller is smaller than the frictional resistance between the steering roller and the floor.

4. A steering roller arrangement as in claim 1 including two vertical arms connected between the ends of the guide rod and the ring mount for suspending the guide rod from the ring mount and for limiting sliding movement of the steering roller on the rod.

5. A steering roller arrangement as in claim 4 including a guide bushing rotatably mounted and axially displaceable on the guide rod, and the axial shaft of the steering roller being connected to the guide bushing.

6. A steering roller arrangement as in claim 1 wherein the steering roller comprises a pair of wheels, each of which is rotatably mounted on a common wheel axle.

7. A steering roller arrangement for a trackless floor vehicle having a frame and two running wheels fixedly arranged on the frame and rotatably, independently of each other, about axles lying on a common line, and a steering roller running on the floor freely rotatable about a wheel axle at a distance from the axles of the running wheels, a rotatable ring mount, the axis of which extends vertically, connecting the steering roller to the vehicle frame and. constructed to provide a trailing effect to the steering roller, a horizontal distance between the vertical axis of the ring mount and the wheel axle of the steering roller comprising a trailing radius, and wherein the steering roller is movable relative tot he rotatable ring mount over a path corresponding to twice the trailing radius between two opposite trailing positions whereby upon a reversal of the direction of travel alternation of the steering roller trailing effect is brought about by a corresponding movement of the steering roller relative to the rotatable ring mount, and a lever arrangement swivelably connecting the steering roller to the ring mount about an axis perpendicular to the vertical axis of the ring mount and parallel to the wheel axle for adjustment between the two opposite trailing positions, and one-way brake means connected to the steering roller for blocking the roller in the opposite trailing positions.

8. A steering roller arrangement as in claim 7 including a self-aligning bearing rotatably mounting the steering roller about an axle perpendicular to the wheel axle and perpendicular to the vertical axis of the ring mount for adapting the steering roller to any unevenness in the floor.

9. A steering roller arrangement as in claim 7 wherein the steering roller comprises a pair of wheels, each of which is rotatably mounted on a common wheel axis.

* * * * *

UNITED STATES PATENT AND TRADEMARK OFFICE
CERTIFICATE OF CORRECTION

PATENT NO. : 5,078,221

DATED : JANUARY 7, 1992

INVENTOR(S) : SIEGFRIED REWITZER ET AL

It is certified that error appears in the above-identified patent and that said Letters Patent is hereby corrected as shown below:

Title Page:
IN THE ABSTRACT, Page 1, line 20, correct the spelling of "means".

Column 1, line 30, after "deviation)" insert -- by --.

Column 3, line 8, "14,1" should read -- 14, 16 --.

line 34, before "whereas" insert -- ring plate 38 of which is fixed to the vehicle frame 4 --.

Column 4, line 54, "34" should read -- 34'. --.

Column 5, line 23, "56" should read -- 56" --.

Column 6, line 38, "tot he" should read -- to the --.

Signed and Sealed this

Thirteenth Day of April, 1993

Attest:

STEPHEN G. KUNIN

Attesting Officer    Acting Commissioner of Patents and Trademarks